United States Patent [19]

Daugherty et al.

[11] Patent Number: 5,125,875

[45] Date of Patent: Jun. 30, 1992

[54] POWER TRANSMISSION BELT, METHOD AND APPARATUS FOR MAKING THE SAME

[75] Inventors: Jerome M. Daugherty, Littleton; Clifford W. Wink, Denver, both of Colo.

[73] Assignee: The Gates Rubber Company, Denver, Colo.

[21] Appl. No.: 599,586

[22] Filed: Oct. 18, 1990

[51] Int. Cl.⁵ .................................... F16G 5/00
[52] U.S. Cl. ........................... 474/260; 474/268
[58] Field of Search ........... 474/239, 259, 260, 265, 474/266, 268

[56] References Cited

U.S. PATENT DOCUMENTS

| | | | |
|---|---|---|---|
| 3,371,548 | 3/1968 | Marzocchi | 474/266 |
| 3,682,012 | 8/1972 | Blankenship | 474/265 |
| 3,820,409 | 6/1974 | Meadows | 474/265 |
| 3,919,025 | 11/1975 | Ray | 474/265 |
| 4,032,384 | 6/1977 | Rauscher | 474/260 |
| 4,083,260 | 4/1978 | Carlson et al. | 474/260 |
| 4,131,030 | 12/1978 | White | 474/262 |
| 4,773,896 | 9/1988 | Bouteiller et al. | 474/268 |

FOREIGN PATENT DOCUMENTS 103134  8/1980  Japan .................. 474/260

Primary Examiner—Ramon S. Britts
Assistant Examiner—Roger J. Schoeppel
Attorney, Agent, or Firm—H. W. Oberg; C. H. Castleman, Jr.; J. L. Isaac

[57] ABSTRACT

A power tansmission belt having a body portion comprising at least one strip of belt body material helically wound at an incline with respect to the surfaces of the finished belt. The belt material is wound against itself to form generally inclined and successive plies of body material. Tensile material or load carrying cord is helically wound between the successive plies of the body material. The method and apparatus for simultaneously winding the belt body material and the load carrying cord is disclosed.

17 Claims, 3 Drawing Sheets

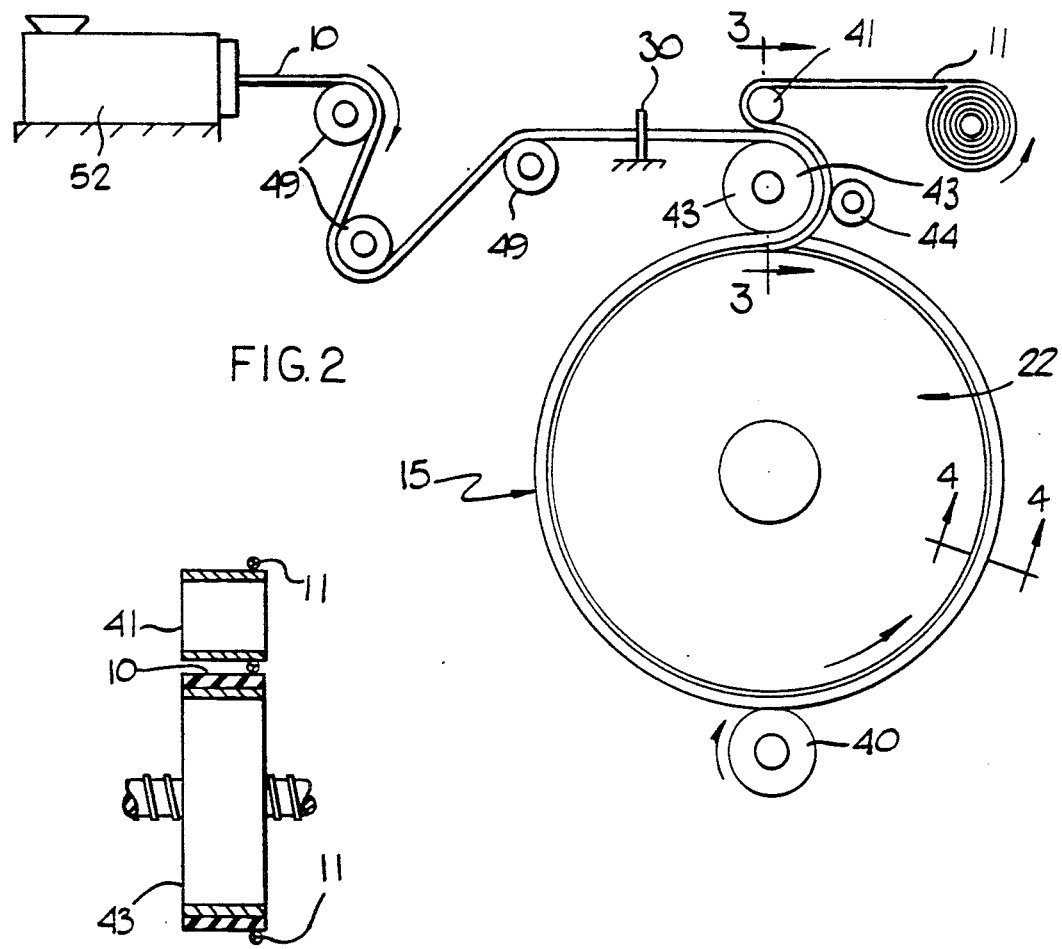
FIG. 2
FIG. 3
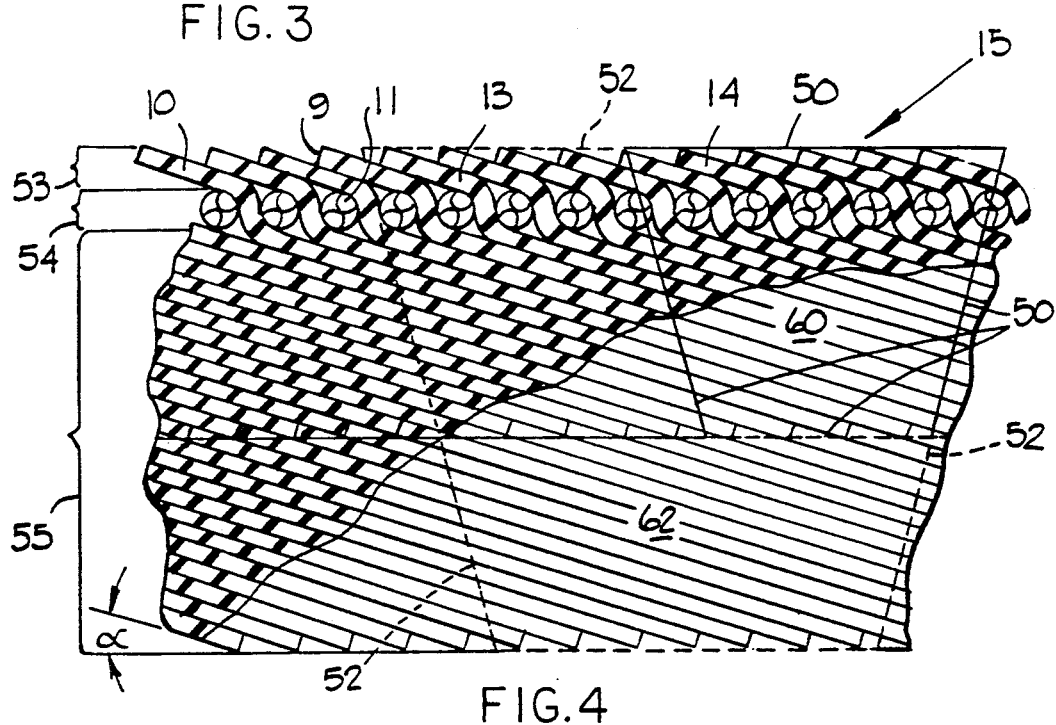
FIG. 4

POWER TRANSMISSION BELT, METHOD AND APPARATUS FOR MAKING THE SAME

BACKGROUND OF THE INVENTION

Power transmission belts are widely used throughout the industry, and the manufacture and sale of such belts is very competitive. One common technique used to make such belts is to ply up layers of belt materials on a cylindrical drum and form a belt sleeve, and cut individual belts from the sleeve. One example of such a belt sleeve is shown in U.S. Pat. No. 3,031,364. Typically, such a belt sleeve is formed of various plies of material used to form the body of the belt. The body is composed of various arrangements and layers of materials, such as fabric layers, cushion layers and fiber loaded layers.

A load carrying section may also be provided, which includes a helically wound load carrying cord spiraled on the drum in a specified position during the building process. Such belts, having load carrying sections are shown in U.S. Pat. Nos. 2,773,540, 3,987,684, 4,264,315, 4,296,640 and 4,734,086. The resulting belt sleeves may be cured first and then cut, or they may be left uncured, with each sleeve then being cut into belt elements. The belt elements may then be wrapped by a fabric sheet prior to curing as shown in U.S. Pat. No. 4,096,764.

The above method of making a belt sleeve is both labor intensive and time consuming. Inventories of various ply stocks in various widths and thicknesses have to be maintained. Also, precise placement and spacing of the spiralled load bearing cord between the overcord or tension section, and undercord or compression section using the above method is sometimes difficult to maintain.

Conveyer belt sleeves have been made by winding rather narrow fiber bats around rollers to form layers which, after needling, are then cut into belt elements as shown in U.S. Pat. No. 3,673,024. However, the conveyer belt sleeve formed does not have a separate load carrying section such as a spiralled cord; consequently, belts made from such sleeves have minimum tensile load carrying capability.

Load bearing cord is used in the power transmission belt of U.S. Pat. No. 4,123,946, but it is necessary to first embed the cord in an elongated strip of polymeric material. This is done by extruding the substantially uncured polymeric material and load carrying cord simultaneously through an extrusion orifice and forming a strip, and then, winding this strip onto a cylindrical drum. Thus, an elongated strip is formed having the load carrying cord extending through and embedded throughout its entire length. However, the wrapping of such strips of polymeric material containing load carrying cord in an adjoining relationship about the drum as shown in the patent is a relatively slow process limited by the extruder output and the wrapping is not easy to achieve because the strip must be bent and helically wound along its narrow edge causing the strip to widen at the edge and neckdown at the opposite edge. It is also difficult to precisely position the load carrying cord relative to the surfaces of the finished belt particularly when the strip changes width dimensions during winding. This is a critical factor affecting the final physical characteristics of the finished belt in terms of locating the load bearing cord in a constant equatorial plane.

It is an object of this invention to provide a power transmission belt formed of belt material and a load carrying cord where the belt material is in the form of a continuous narrow strip instead of layered wide sheets or plies. The strip eliminates the need for an inventory of wide stock sheets and the processing equipment to make the inventory. The continuous strip of belt material is easily helically wound about a belt building drum with an adjacent cord to form a belt sleeve. This decreases the building time required for each belt and results in cost savings.

It is another object of this invention to precisely place the load carrying cord. This is achieved during helical winding by adhering the load carrying cord to an adjacent surface of the strip of belt material and winding the cord and the strip of belt material simultaneously about the building drum. Thus, the belt material with the adhered cord helps achieve uniform cord spacing. The adjacent belt material between successive cords acts as a uniform insulation that retards the development of cord line sheer and substantially prevents self abrasion between successive cords during the belt operation.

It is another object of the instant invention to wrap the strip or strips of belt material simultaneously with the load bearing cord or cords so that inclined plies of belt material are formed with cord between each ply for easy helical winding around a building drum.

It is a further object of the invention to form a belt sleeve on the belt building drum by simultaneously winding belt material with the load bearing cord. The so formed belt sleeve is then cut into individual belt elements and covered with a fabric wrap. The covered belt elements are then cured to define a finished belt. Alternatively the belt sleeve may be cured first and then cut, ground, or otherwise severed into the desired belt shape such as a cut edge V-belt or V-ribbed belt.

Other detailed features, objects, uses and advantages of this invention will become apparent in the embodiments thereof presented in the following specifications, claims and drawings.

SUMMARY OF THE INVENTION

The invention relates to a power transmission belt having a body portion with a tension section, a compression section and a load carrying section embedded between the tension section and compression section of the belt. The body portion comprises at least one strip of body material helically wound at an incline with respect to the surfaces of the finished belt. The strip of body material is wound against itself to form generally inclined and successive plies of body material. The load carrying section of the transmission belt comprises a tensile member or a load carrying cord spaced from at least one edge of the strip of body material and positioned against at least one side or surface of the strip. The load carrying cord is simultaneously helically wound with the strip on a belt building drum in the finished belt. The load carrying cord is spaced from one of the inner or outer surfaces of the finished belt and is impressed between layers in the body portion.

The invention further comprises the method of making the power transmission belt as described above and also the apparatus for making the same.

BRIEF DESCRIPTION OF THE DRAWINGS

The accompanying drawings show the preferred embodiment of this invention in which:

FIG. 2 is a side view of the belt building drum assembly and feed mechanisms of the instant invention.

FIG. 3 is a section view of the mechanism taken along the line 3—3 of the positioning of FIG. 2.

FIG. 4 is a cross-sectional view of a belt sleeve formed by the method of the instant invention showing the manner in which the belt sleeve may be cut for belts. The cross-sectional view is a partial, enlarge axial cross-sectional view of a sleeve as taken in the vincinity of arrow 4 of FIG. 1 and in the direction of line 4—4 of FIG. 2.

DETAILED DESCRIPTION OF THE INVENTION

Figure 1:
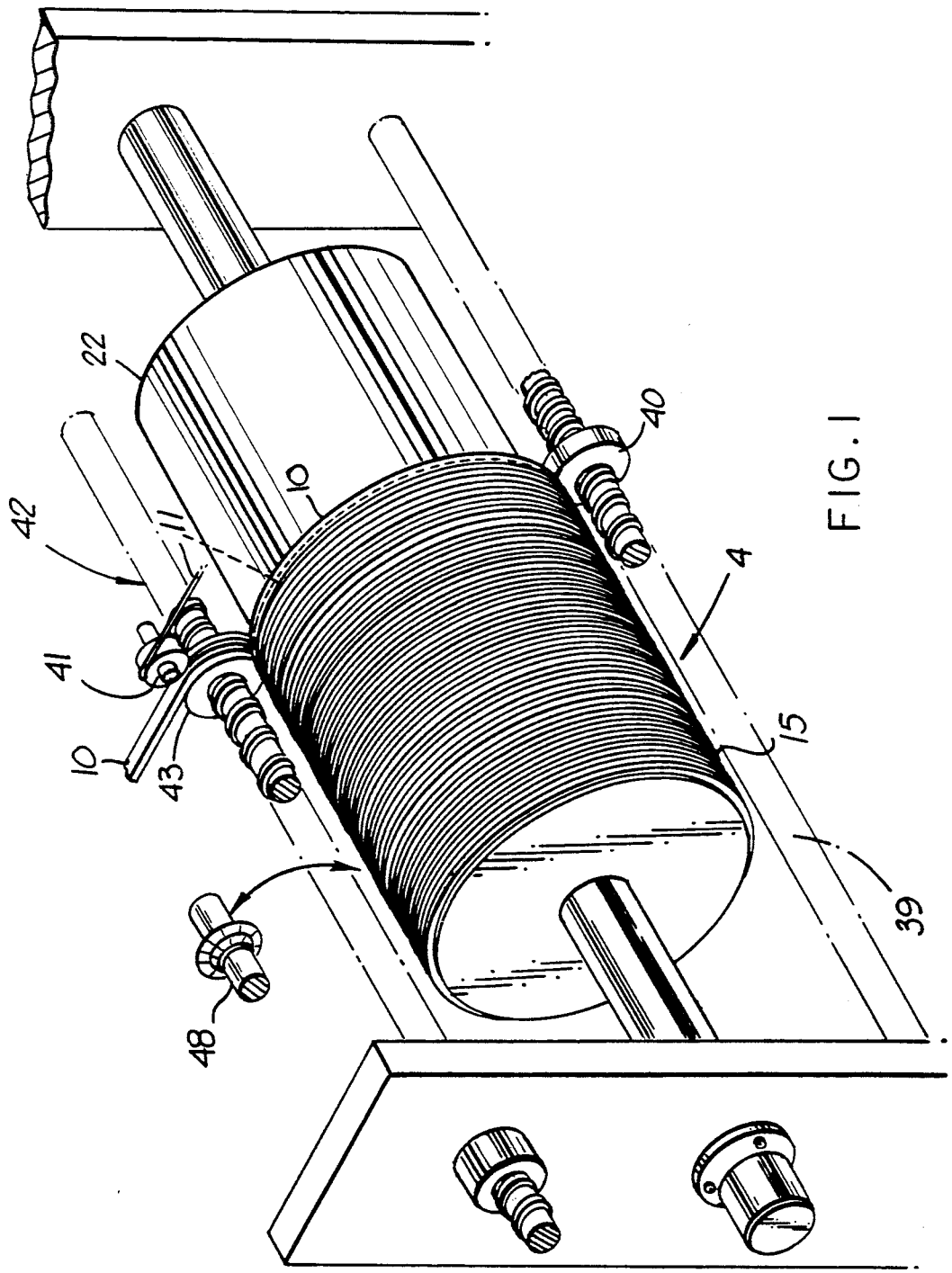
FIG. 1 is a perspective view of a belt building assembly in accordance with the instant invention.

Reference is now made to FIG. 1 which shows a belt sleeve 15 formed utilizing the method of the instant invention. The belt sleeve 15 is formed on a rotating drum assembly 22. The size of the belt sleeve and drum assembly determines the size of the finished belt. At least one continuous strip of belt material 10, shown enlarged, is helically wound on the drum assembly 22, in overlapping relationship. The strip is wound at an incline with respect to the surface of drum assembly 22 and the surface of the resulting belt sleeve. The belt material 10 is wound against itself forming generally inclined plies of belt material on the drum.

Tensile material 11, (shown in dashed lines), is also helically wound simultaneously onto building drum assembly 22 with the inclined strip. Tensile material 11 is preferably a load carrying cord. Preferred material for the cord includes polyester, fiberglass, and aramid. The cord 11, fed by roller 41, is pressed against the strip of belt material and adhered thereto at a predetermined distance from an edge of the strip. The strip and cord are then simultaneously wound on the drum assembly 22 so that the load bearing cord 11 lies between each inclined ply of the strip belt material 10. Thus, plies of belt material 10 are formed with load bearing cord 11 lying between each ply and at a precise distance from a surface of the formed belt sleeve. The strip of belt material 10 and the tensile material 11 are laid against the drum assembly and overlapped onto at least the just preceding wrap of belt material and cord using a cross feed mechanism 42 that traverses the drum using a positioning mechanism 43 as is well known in the art. Pressure roller 40 aids in pressing against and compacting the inclined plies of belt material and tensile material on the rotating drum assembly. Pressure roller 40 rotates about axis 39 in a direction substantially parallel to the rotational axis of the drum and moves in synchronization with positioning mechanism 43.

The belt material is preferably an elastomer such as material rubber, synthetic rubber, or blends thereof and may be of the type known as gum stock, fiber loaded stock, or rubberized fabric stocks. The tacky nature of the uncured belt material aids in adhering or cohering to the tensile material or cord to the strip of belt material. If fiber loaded stocks or gum stocks are used, the strip of elastomeric material may be formed by an extruder 52 such as shown in FIG. 2. Thermoplastic materials may be extruded to form a strip and an adhesive may be used to adhere the cord to the strip of belt material.

After the extruded strip 10 is sized and conditioned by rollers 49, the strip passes through guide 30 which positions it precisely on traversing roller 43. Roller 41 shown in FIG. 3 precisely feeds and positions cord 11 in its predetermined position relative to an edge and along a width of the moving strip of belt material. Roller 44 holds cord 11 and strip 10 together long enough to assure that the cord is adhered and seated in its predetermined position on the strip. Roller 43 feeds the strip belt material and the load carrying cord onto the surface of the belt building drum assembly 22 during the winding operation.

After completion winding of the the body material 10, and the load bearing cord 11 on drum assembly 22, the belt sleeve 15 is formed as is shown in cross-sectional view in FIG. 4. A load carrying section 54 containing the load carrying cord 11 lies interpositioned between the tension section 53 and the compression section 55, so as to form the body portion of the belt.

In the preferred embodiment, the load carrying section 54 is spaced from edge 9 of the belt material 10. By simultaneously winding both the body material and cord in a helical fashion, the tensile load carrying section 54 is relatively precisely positioned in each resulting belt sleeve and each resulting belt element cut from the sleeve. The plies of belt material 10 are "contoured" or "nested" around tensile cord 11 thus providing insulation and relatively precise placement for the tensile material 11. The cord is adhered or impressed against one side of the belt material in each finished belt sleeve. The sleeve can then be cut into belt body portions by cutting knife 48, (shown in FIG. 1), as is well known in the art.

Strips of only belt material may be successively helically wound over the first cord and strip layer to form a thicker belt sleeve. The cutting lines of a thicker belt body portion 62 cut from belt sleeve 15, are shown at 52. In this case, the sleeve is cut to include more plies of belt material 10 of a greater sleeve thickness. The cutting lines 50 define the shape of a smaller belt body portion 60 cut from the belt sleeve of the instant invention. In this case, fewer plies of a narrower width will be used to build the smaller belt body portion.

In each belt body portion cut from belt sleeve 15, there is at least one ply of body material 13, 14 which forms part of both the tension section 53 and the compression section 55 of the belt element. This adds to the precise positioning and stability of the cord.

Figure 5:
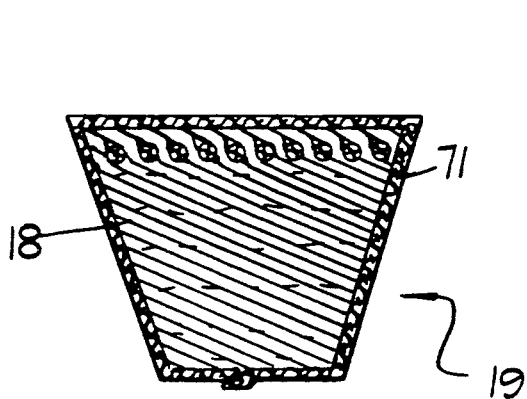
FIG. 5 shows a cross-sectional view of a fabric wrapped belt made in accordance with the instant invention.

FIG. 5 shows a belt body portion 18 of the instant invention after it is cut from the belt sleeve 15. The belt body portion 18 is thereafter covered by a fabric wrap 71 as is well known in the art. The resulting belt 19 is then cured using well known methods. If required by the shape of the belt body portion cut from the sleeve, the belt body portion may be flipped or inverted as is well known in the art to achieve the configuration shown.

Figure 6:
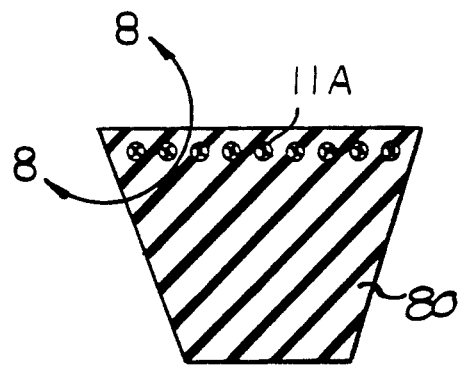
FIG. 6 shows a cross-sectional view of a raw edged V-belt made in accordance with the instant invention.

Alternatively, the method and apparatus outlined above may be used to form a raw edged V-belt. In this case, the entire belt sleeve is cured and then cut or ground into shape 80 as shown in FIG. 6. Thus a belt severed from a cured belt sleeve can also be made using the method and teaching of instant invention.

Figure 7:
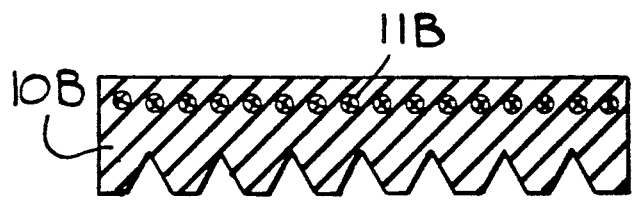
FIG. 7 shows a cross-sectional view of a V-ribbed be x in accordance with the instant invention.

A V-ribbed belt is shown in FIG. 7. It is also made by helically winding belt material 10B simultaneously with the winding of tensile material 11B. Again, the entire belt sleeve is cured with cutting or grinding being done after the curing process.

Figure 8:
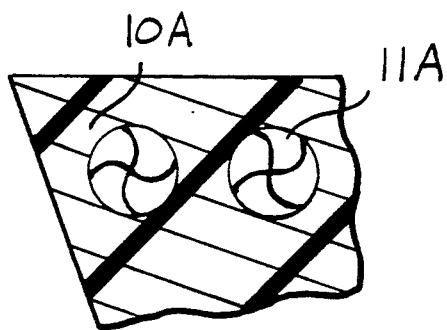
FIG. 8 is an enlarged view of section 8—8 of the belt of FIG. 6.

FIG. 8 shows a magnified section of the belt of FIG. 6 showing tensile material 11A. After wear or a period of time, the plies of belt material 10A will be faintly visible. The belt of FIG. 7 likewise would have faintly visible plies (not shown) after a period of time.

The body portion of the power transmission belt of the instant invention can comprise various configurations of belt material; and thus alternative embodiments are possible. For example, a strip of belt material used to form the belt body portion can be folded to achieve a chevron construction such as when nonhomogeneous materials are used for the belt body portion. Tensile material or cord is wound simultaneously with support material so that the tensile material lies between and adjacent the inclined plies of belt material.

Alternatively, an edge of the extruded strip of the belt support material has an edge that is looped around the tensile material cord to double the layering of the support material around the tensile material and also assure a precise placement of the cord. This would also allow a dual spiral application where a single wind of belt support material would be interpositioned between adjacent winds of cord.

Different belt material strip stock may be used to make the belt portion. For example, a strip of body material with embedded fabric may be used. Dual extruders may be used to extrude the basic body material stock desired or to extrude the fabric impregnated stock or another formulation of body stock to form the desired body portion.

The compression layer may also be formed by layering plies of various stock material on a belt building drum to achieve the desired compression section. The belt material 10 and tensile material 11 are helically wound on top of the various plies of the compression layer in this embodiment. The result is a desired belt composition or construction sought to be achieved.

While the present embodiments of this invention and the methods of practicing the same have been illustrated and described it would be recognized that this invention may be otherwise embodied and practiced within the scope of the following claims.

What is claimed is:

1. In a power transmission belt having a body portion with a tension section, a compression section, and a load carrying section embedded between said tension section and said compression section, said belt having top and bottom surfaces, the improvement comprising:
   at least one strip of body material helically wound at an incline with respect to one of said surfaces, said strip being wound against itself to form generally inclined plies of body material, said strip defining the belt body portion; and
   said load carrying section comprising a tensile member spaced from at least one edge of said strip and positioned against at least one side of said strip, said tensile member being helically wound with said strip and spaced from one of said surfaces, said tensile member being embedded in said body portion of said belt.

2. A power transmission belt as claimed in claim 1 wherein said tensile member is a cord.

3. A power transmission belt as claimed in claim 1 wherein said strip forms a contour around said tensile member of said belt.

4. A power transmission belt as claimed in claim 1 wherein said belt material is an elastomer.

5. The power transmission belt as claimed in claim 1 further comprising a fabric cover surrounding said belt body portion.

6. The power transmission belt of claim 1 wherein said belt is a raw edged V-belt.

7. The power transmission belt of claim 1 wherein said belt is a V-ribbed belt.

8. In a power transmission belt having a body portion with a tension section, a compression section, and a tensile member embedded between said tension section and said compression section, said belt having top and bottom surfaces, the improvement comprising:
   a least one strip of body material helically wound at an incline with respect to one of said surfaces, said strip being wound against itself to form generally inclined plies of body material, said strip forming a contour around said tensile member of said belt.

9. The method of making a power transmission belt by cutting belt body portions from a belt sleeve comprising the steps of, providing at least one strip of belt material, providing at least one strip of tensile material, adhering said strip of belt material to said strip of tensile material while simultaneously spacing said tensile material from at least one edge of said strip of belt material, and helically winding said adhered strips of belt material and tensile material around drum means to form a sleeve, said step of helically winding including the step of forming inclined plies of said belt material with respect to said drum means.

10. The method of claim 9 wherein the step of helically winding said belt material includes the step of winding said belt material so as to simultaneously form part of both the tension section and the compression section of said belt body portions.

11. The method of claim 9 further comprising the steps of covering each said belt body portion with a fabric wrap and curing said covered belt body portion.

12. The method of claim 9 further comprising the steps of curing said belt sleeve prior to cutting said belt sleeve into belt body portions.

13. The method of claim 9 further comprising the steps of feeding said belt material to said drum means while simultaneously feeding said tensile material to said drum means.

14. The method of claim 13 wherein said step of feeding further comprises the step of extruding said belt material.

15. The method of claim 9 further comprising the step of contouring said strip of belt material around said strip of tensile material.

16. In a belt building apparatus of the type having a rotating drum for building a belt sleeve and cross-feed means for traversing the rotating drum at a predetermined rate, and means for providing tensile material to said cross-feed means, the improvement comprising: means for providing at least one continuous strip of belt material to said cross-feed means, means for adhering said tensile material to said continuous strip of belt material at a predetermined location spaced from at least one edge of said strip of belt material, said crossfeed means comprising means for feeding said strip of belt material with said adhered tensile material to said rotating drum, means for helically winding said strip of belt material in an overlapping relationship with respect to the surface of said drum so as to form inclined plies of said belt material on said rotating drum.

17. The belt building apparatus of claim 16 further comprises means for contouring said belt material around said tensile material.

* * * * *